United States Patent Office.

GALEN S. WOOD, OF VASSALBOROUGH, MAINE.

Letters Patent No. 112,201, dated February 28, 1871.

IMPROVEMENT IN MEDICAL COMPOUNDS OR LINIMENTS.

The Schedule referred to in these Letters Patent and making part of the same.

I, GALEN S. WOOD, of Vassalborough, in the county of Kennebec and State of Maine, have invented a certain Compound, called by me Wood's Universal Liniment, to be used externally upon the human body for headache, neuralgia, rheumatism, sores, sprains, cuts, bruises, burns, scalds, chilblains, corns, &c., and also for scratches, galls, sores, bruises, and lameness on horses.

The nature of my invention consists in mixing oil of wormwood, oil of cedar, oil of juniper, ammonia, camphor, alcohol, vinegar, beef-gall, with a solution of Castile soap, salt, and saltpeter, dissolved in hot water.

To prepare the said liniment, take eight ounces of Castile soap, eight ounces of saltpeter, sixteen ounces of salt, and dissolve the same in one gallon of hot water.

Then take two ounces of the oil of wormwood, two ounces of the oil of cedar, two ounces of the oil of juniper, twenty ounces of ammonia, three quarts of alcohol, one gallon of vinegar, one quart of beef-gall, and mix them with the preparation aforesaid, to wit: the solution of soap, saltpeter, and salt, which after mixing, is ready to be used externally, as above described.

I claim as my invention—

The manufacture or preparation of a compound, which is denominated Wood's Universal Liniment, in the proportions and for the purposes set forth.

GALEN S. WOOD.

Witnesses:
    JACOB BUTTERFIELD,
    JOHN MOWER.